Patented Apr. 5, 1927.

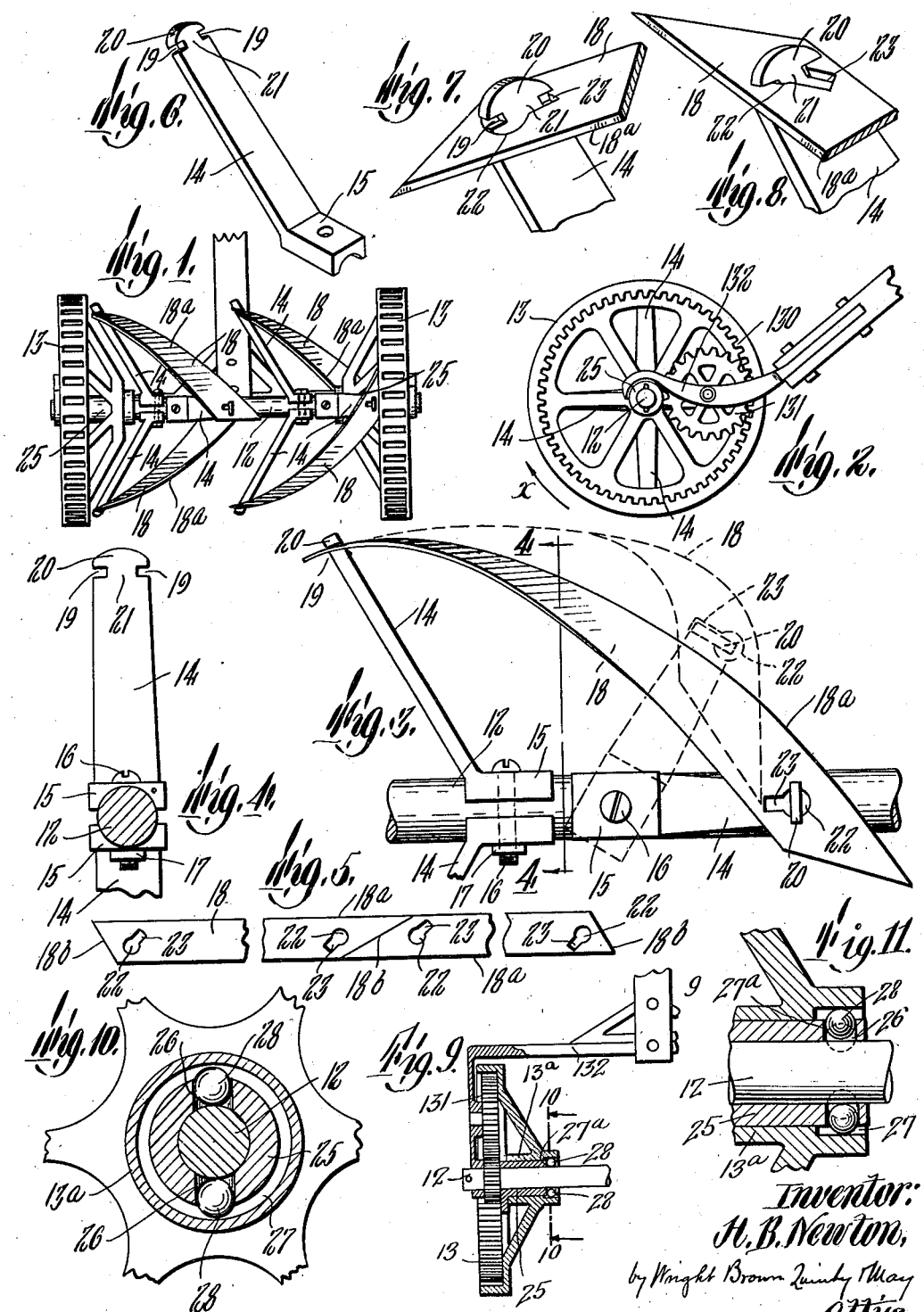

1,623,433

UNITED STATES PATENT OFFICE.

HERBERT B. NEWTON, OF BROOKLINE, MASSACHUSETTS.

LAWN MOWER.

Application filed November 7, 1925. Serial No. 67,567.

This invention relates to a lawn mower which includes an axle supported by traction wheels and driven by mechanism which includes said wheels, and resilient cutting blades connected with the axle, and revolved by the rotation thereof to cut grass.

The chief object of the invention is to provide an improved construction of the blades and of the means connecting the blades with the axle, whereby at a relatively small cost, and by the employment of a minimum number of parts, an efficient and durable lawn mower is produced, the blades of which may be quickly and conveniently removed for sharpening, and replaced for use.

Of the accompanying drawings forming a part of this specification,—

Figure 1 is a front view of a lawn mower embodying the invention.

Figure 2 is an end view of the same.

Figure 3 is a fragmentary view, showing an enlargement of a portion of Figure 1, and illustrating by dotted lines a part of the operation of connecting a blade with the axle.

Figure 4 is a section on line 4—4 of Figure 3, looking toward the left, the blade shown by Fig. 3 being omitted.

Figure 5 is a side view of two blades formed from a single strip, portions of the strip being broken away.

Figure 6 is a perspective view of one of the spider-arms connecting the blades with the axle.

Figure 7 shows enlarged, and in perspective, a portion of the spider-arm shown by Figure 6, and a portion of a blade partly engaged with the arm.

Figure 8 is a view similar to Figure 7, showing the blade fully engaged with the arm.

Figure 9 is a fragmentary top plan view, showing portions of the mower frame and the axle, one of the traction wheels, a bearing of the axle, and a portion of the frame being shown in horizontal section.

Figure 10 is a section on line 10—10 of Figure 9.

Figure 11 is an enlargement of a portion of Figure 9.

The same reference characters indicate the same parts in all of the figures.

In the drawings, 12 designates an axle supported and adapted to be rotated by traction wheels 13, at opposite end portions of the axle, any suitable one-way driving mechanism being provided, including one-way clutches, and organized to permit the axle to remain at rest when the mower is moving backward, and cause the rotation of the axle when the mower is moving forward. Driving mechanism adapted to operate as above stated is well known. It is therefore unnecessary to describe the same, further than to state that the traction wheels 13 have internal gears 130 (Figure 2) meshing with intermediate gears 131 which transmit one-way torque from the traction wheels to the axle.

In carrying out my invention, I secure spider-arms 14 to the axle 12. As here shown, said arms are formed on base blocks 15, fitted to the axle, and movably fixed thereto by clamping bolts 16, having nuts 17. Each bolt secures two arms 14, as shown by Figures 3 and 4. The arms are oblong in cross section as shown by Figs. 3 and 4, and each has an integral keeper at its outer end, adapted to engage one end of a flexible blade 18. The arms 12 project laterally from the axle, and are preferably inclined relative thereto. The arms are arranged in pairs, one arm of each pair engaging one end of a blade, and being inclined in one direction, and the other arm the opposite end of the blade, and being inclined in the opposite direction. The angularity or direction of projection of one arm differs from that of the other, so that the engagement of a resilient blade with both arms imparts a spiral curvature to the blade.

I prefer to form the integral keepers by cutting open slots 19 in the opposite edges of the arms close to the outer ends thereof, so that a substantially T-shaped keeper is provided, composed of a head 20 and a neck 21.

In the opposite end portions of the blades 18, I form keyhole slots, each including a circular portion 22, and a narrower portion 23. The form and arrangement of the keepers and the keyhole slots are such that the blade 18 may be applied to the keeper on one arm 14, of a pair of arms, by holding the blade in the abnormal or inoperative position indicated by Figure 7, said position differing from the normal operative position, as indicated by Fig. 8, moving the blade sidewise until its slot receives the keeper, and then swinging the blade edgewise on the keeper to the operative position indicated by Figure 8. The circular portion 22 of the slot is thus caused to embrace the neck 21 of the keeper, and prevent endwise and edgewise movements of the blade, a portion of the blade being located in the arm slots 19, so that sidewise movements of the blade are prevented. The end of the blade and the keeper of the arm shown at the left in Figure 3, are positively connected by the above described operation. To connect the opposite end of the blade with the other arm 14 of the pair, I withdraw the bolt 16 sufficiently to permit the separation of the base 15 from the axle, and turn the arm to the position shown by dotted lines in Figure 3, thus locating the keeper of that arm in position to enter the keyhole slot in the corresponding end of the blade, when the latter is abnormally flexed, as indicated by dotted lines. The arm is then swung back to and secured in its operative position, so that its keeper is engaged with the circular portion of the keyhole slot in the manner above described, a normal flexure being at the same time imparted to the blade, so that the latter is confined in its operative position.

It will be seen that the integral keepers on the arms, and the keyhole slots in the blades constitute an inexpensive and simple means for positively securing the blades in their operative positions, no fastening means additional to the arms and blades being required.

Each blade is made from a resilient strip of steel, and has parallel longitudinal edges, one of which is sharpened and constitutes a cutting edge 18ª. The blade has transverse end edges 18ᵇ, which are oblique to the longitudinal edges. Said end edges intersect the cutting edge at acute angles, as shown by Figure 5, which represents two blades cut from a single strip. One of the end edges 18ᵇ is preferably longer than the other. The major axes of the keyhole slots are preferably oblique to the longitudinal edges, as shown by Figure 5.

Owing to the described form of the blade, and the described arrangement of the keyhole slots, the cutting edge 18ª is longer than the back edge, the end edges are wholly behind the cutting edge, and the keyhole slots are adapted to be engaged with the keepers, without requiring an extreme abnormal flexure of the blade in engaging one end thereof with an arm which has been swung from its operative position. Moreover, said form and arrangement are advantageous when the arms are arranged in groups, as shown by Figure 1, each group including a pair of arms cooperating, as described, with a blade. The groups are arranged in tandem order on the axle, and the arrangement is such that the inner ends of the blades engaged with the arms of one group, project into the spaces between the inner ends of the blades engaged with the arms of the next group, so that the blades overlap and collectively cut a swath whose width is equal to the distance between the outer ends of the blades, this being practically the distance between the traction wheels 13.

The axle 12 is journaled in bearings 25, shown in elevation by Figure 1, and fixed to portions of the mower frame, one of said portions being designated by 132 in Figures 2 and 9. One of said bearings is shown in section by Figures 9 and 10. The hubs of the traction wheels are journaled on the bearings 25, the latter being externally cylindrical. One of said hubs is designated by 13ª in Figures 9 and 10. In the inner end portion of the bearing 25, are formed circular orifices 26, Figs. 10 and 11. In the inner end of the hub is formed an annular recess 27, communicating with the orifices 26. To confine the hub against displacement to the right from the position shown by Figures 9 and 11 I provide balls 28, inserted loosely in the orifices and bearing on the axle. The diameter of the balls is such that their outer portions project into the recess 27, and form stops which are adapted to bear on the inner end 27ª of the recess, and prevent more than a slight endwise movement of the hub from the position shown by Figures 9 and 11.

The balls are placed in the orifices 16, after the hub has been placed on the bearing 25, and before the axle is inserted in the bearing. The balls are loose, and in case they project into the bearing, as shown by dotted lines in Figure 11, they are forced outward by the axle to the full line position, when the axle is inserted in the bearing. Provision is thus made at a very slight expense, for positively confining the hub on the bearing without frictional resistance to the rotation of either the hub or the axle.

The direction of rotation of the axle is preferably such that the cutting edges of the blades move in a circular path in the direction indicated by the arrow x (Figure 2), so that the cutting edges move forward and upward in cutting. I prefer to make the blades shorter than the distance between the traction wheels and to arrange the blades and the spider-arms in groups as shown.

The arrangement of the blades and their cutting edges shown by Figure 1, is such that the spiral cutting edges of the blades in one group cut progressively from one traction wheel inward to the midlength portion of the space between the wheels, while the spiral edges of the blades in the other group cut progressively inward from the other traction wheel to said midlength portion. The tendency of the blades is therefor to cut toward the center of the mower, or in other words, toward the midlength of the space between the traction wheels, this tendency causing the blades to incline the grass being cut toward the center and prevent it from clogging the hubs of the traction wheels.

The resilient blades, detachably secured, assume a substantially straight form when detached, so that they may be readily sharpened, and are easily caused to assume a suitable spiral form by the operation of attaching them to the arms 14. Owing to the fact that the blades do not cooperate with a fixed cutting element, the spiral formation is not necessarily mathematically exact or predetermined, and may deviate somewhat from a true spiral, all that is essential being to produce a formation that will ensure substantial uniformity of the height of the cut grass. The blades are rigidly supported only at their ends, and are elsewhere free to spring and yield, so that they are adapted to pass uninjured, or with a minimum of injury, over obstructions on the ground projecting into their path.

I claim:

1. A lawn mower comprising a driven axle, spider arms fixed to and projecting laterally therefrom and provided with keepers at their outer ends, the arms being arranged in pairs, and resilient blades having keyhole slots in their end portions adapted to receive the keepers when the blades are moved sidewise upon the arms to an abnormal inoperative position, and to be interlocked with the keepers by edgewise swinging movements of the blades to normal operative positions, one arm of each pair having a different angular arrangement from the other, causing a spiral formation of the blade engaged therewith.

2. A lawn mower as specified by claim 1, one arm of each pair of spider arms being movably fixed to the axle, whereby it may be swung to and from a normal operative position to a position where its keeper will enter the keyhole slot in the blade when the latter is in an abnormal inoperative position, the arm and blade being positively engaged by movement thereof to their operative positions.

3. In a lawn mower, a spider-arm oblong in cross section, having means at its inner end whereby it may be movably fixed to an axle, and provided in its edges adjacent the outer end with slots forming with the outer end a T-shaped keeper integral with the arm, and a cutting blade having a keyhole slot adapted to receive said keeper when the blade is in an abnormal inoperative position, said keeper being positively engaged with the keyhole slot when the cutting blade is in a normal operative position.

4. In a lawn mower, a resilient blade provided with parallel longitudinal edges, one of which is a cutting edge, and with keyhole slots in its opposite ends, the longitudinal axes of the slots being oblique to the longitudinal edges of the blades, substantially as and for the purpose specified.

5. In a lawn mower a flexible blade having parallel longitudinal edges, one of which is a cutting edge, and the other a back edge, transverse end edges oblique to the longitudinal edges, and keyhole slots in its opposite end portions, one of said transverse edges being longer than the other and each transverse edge intersecting the cutting edge at an acute angle so that the cutting edge is longer than the back edge.

6. A lawn mower comprising a driven axle, spider arms fixed to and projecting laterally therefrom and provided with keepers at their outer ends, the arms being arranged in groups each including a pair of cooperating arms, the groups being located in tandem order on the axle, and resilient blades, one for each pair of arms, each blade having a forwardly moving cutting edge, the blades being provided with means for positively engaging the keepers on said arms, the arrangement being such that each blade is maintained in spiral form by its engagement with a pair of arms, and the inner ends of the blades engaged with the arms of one group project into the spaces between the inner ends of the blades engaged with the arms of the next group, so that the blades overlap and collectively cut a swath whose width is equal to the distance between the outer ends of the blades.

7. In a lawn mower a driven axle provided with cutting means, a bearing in which an end portion of the axle is journalled, a traction wheel having a hub journalled on said bearing, the bearing being provided with orifices in its inner end portion, and the hub with an annular recess communicating with said orifices and hub-confining balls loosely confined by the axle in the bearing orifices and projecting into the hub recess to prevent inward endwise displacement of the hub.

8. A lawn mower as specified by claim 6, having the spider arms positioned on the axle and the spiral cutting edges of the blades arranged at such an angle that the cutting action of each blade begins at a point in proximity to the end of the axle and progresses inwardly longitudinally of the axle, whereby the blades of the two groups cut and deflect grass inwardly from the traction wheels and prevent it from clogging the hubs of said wheels.

9. A lawn mower comprising traction wheels and a rotary cutting element composed of thin blades of resilient steel which are detachable, the sides and rear edges of the blades arranged to travel in substantially the same path as the cutting edges, and the space below and in front and to the rear of the blades entirely unobstructed, so that the standing grass in the path of the blades is encountered only by the cutting edges, and the rotary cutter is rendered operative independent of any coacting means, the spaces between the blades permitting grass to stand in the path of each edge, and means for mounting and rotating said cutting element.

10. A lawn mower comprising traction wheels, an axle supported by the wheels, gearing connecting the traction wheels with the axle, blade holders fixed to the axle and including securing means adapted to detachably engage blade ends, normally flat sided resilient cutting blades detachably secured to the holders, said holders being arranged to cause a spiral formation of the blades by the operation of securing them to the holders, and to hold the sides of the blades non-radial to the axle, so that the sides of the blades follow the cutting edges, the blades being adapted, by the non-radial arrangement of their sides, to cut standing grass wholly by the impact of their cutting edges against the grass.

11. A lawn mower comprising traction wheels, an axle supported by the wheels, gearing connecting the traction wheels with the axle and organized to rotate the axle in a direction opposite that of the rotation of the wheels, blade holders fixed to the axle and including securing means adapted to detachably engage blade ends, normally flat sided resilient cutting blades detachably secured to the holders, said holders being arranged to cause a spiral formation of the blades by the operation of securing the latter to the holders, and to hold the sides of the blades non-radial to the axle, so that the sides of the blades follow the cutting edges, the blades being adapted, by the non-radial arrangement of their sides, to cut standing grass wholly by the impact of their cutting edges against the grass, the effectiveness of the impact being increased by the specified direction of rotation of the axle.

In testimony whereof I have affixed my signature.

HERBERT B. NEWTON.